April 6, 1965     H. H. LEERKAMP     3,176,548

HOLE LOCATING DEVICE FOR DRILLING OR THE LIKE

Filed Oct. 23, 1962     2 Sheets-Sheet 1

Herbert H. Leerkamp
INVENTOR.

BY *Clarence A. O'Brien*
*and Harvey B. Jackson*
Attorneys

April 6, 1965    H. H. LEERKAMP    3,176,548
HOLE LOCATING DEVICE FOR DRILLING OR THE LIKE
Filed Oct. 23, 1962    2 Sheets-Sheet 2

Herbert H. Leerkamp
INVENTOR.

BY *Clarence A. O'Brien*
*and Harvey B. Jackson*
Attorneys

United States Patent Office 3,176,548
Patented Apr. 6, 1965

3,176,548
HOLE LOCATING DEVICE FOR DRILLING
OR THE LIKE
Herbert H. Leerkamp, Berne, Ind., assignor of thirty-three and one-third percent each to George A. Pauley and Robert E. Eash, Decatur, Ind.
Filed Oct. 23, 1962, Ser. No. 232,383
8 Claims. (Cl. 77—62)

The present invention generally relates to hole locating devices for drilling, and more particularly to a novel drill jig having various adjustable features incorporated therein so as to accommodate a wide range of situations without the necessity of maintaining a plurality of separate jigs.

The necessity or desirability of maintaining a large stock of various size drill jigs can, in many instances, be an expensive proposition especially in those situations wherein specific jigs, while essential, are in fact only very infrequently used, as well as those situations wherein a drill jig becomes obsolete.

Accordingly, one of the primary objects of the present invention resides in the provision of an adjustable drill jig which can be adjusted so as to position a drill in a wide range of predetermined positions relative to a workpiece, and additionally, can be adjusted so as to accommodate various sized drills for the formation of a wide range of different size holes.

Another object of the present invention resides in the provision of a novel drill jig which eliminates the expense involved in acquiring a new jig for every different situation which arises.

Also, an object of the present invention resides in the provision of a drill jig which can be adjusted in accordance with various situations with a means for triple checking the drill guiding bushing so as to eliminate any possible chance of error.

Another object of the present invention resides in the provision of a drill jig to which various inspection gauges can be readily adapted.

Additionally, it is an object of the present invention to provide an adjustable drill jig which is relatively simple in structure, comparatively easy to adjust and capable of providing a rigid support for a workpiece while at the same time capable of being disassembled if necessary.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
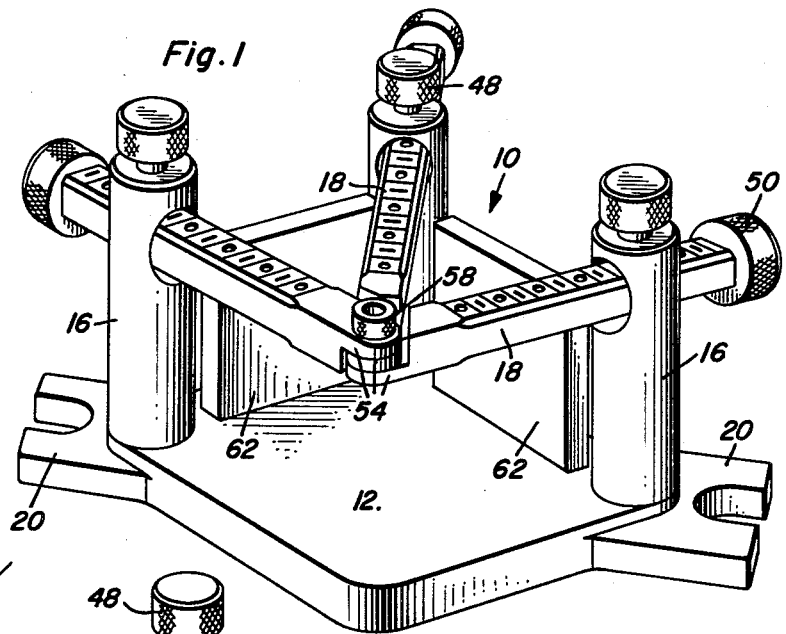
FIGURE 1 is a perspective view illustrating the hole locating device or drill jig comprising the present invention.
Figure 5:
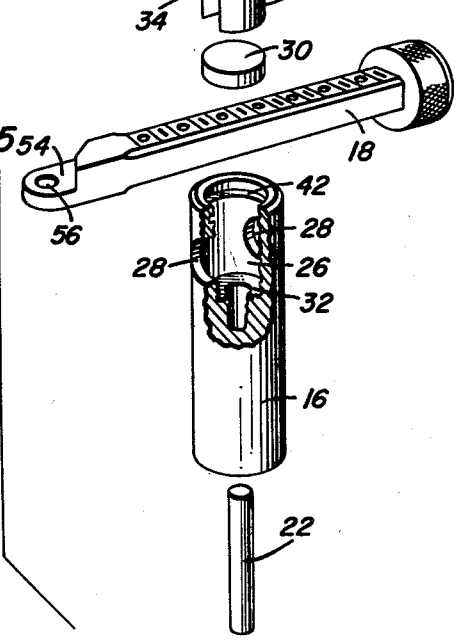
FIGURE 5 is an exploded perspective view of one of the three adjustable portions provided on the drilling jig.
Figure 4:
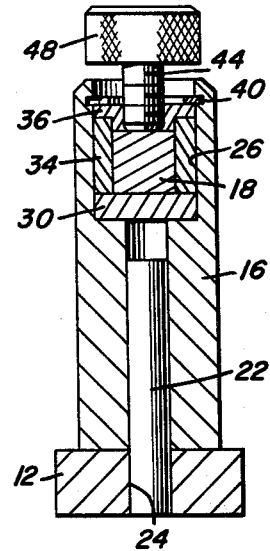
FIGURE 4 is a cross-sectional view taken substantially upon a plane passing along line 4—4 in FIGURE 3.

Referring now more particularly to the drawings, reference numeral 10 generally designates the hole locating device or drilling jig comprising the present invention. This drilling jig 10 consists essentially of a flat rectangular base 12 the bottom surface of which is to be positioned upon a suitable support properly orientated relative to a drill 14 and the upper surface of which is to receive a workpiece, three upstanding rotatably mounted trunnions 16 and three elongated bars 18 adjustably mounted by the trunnions 16.

The flat base 12 is provided with two outwardly extending lugs 20 located at diametrically opposed corners with the lugs 20 being bifurcated so as to form a means for securing the drill jig 10 to a suitable supporting surface, the bifurcated lugs 20, for example, being particularly suited for the reception of securing bolts therethrough.

Figure 2:
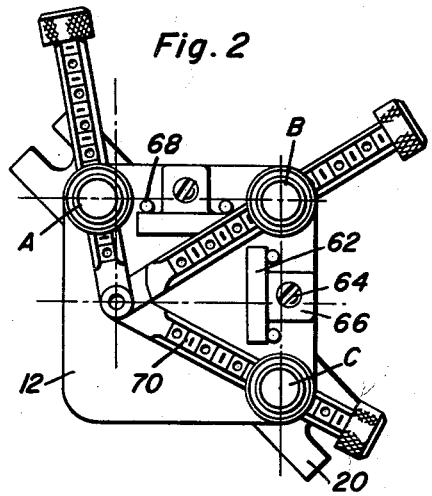
FIGURE 2 is a reduced top plan view of the drilling jig.
Figure 3:
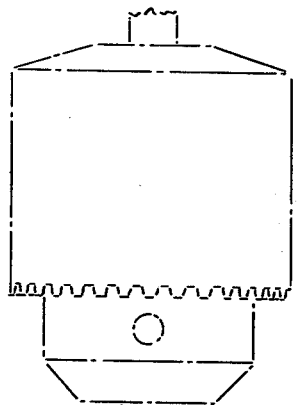
FIGURE 3 is an enlarged cross-sectional view of the drilling jig with a conventional drill inserted therethrough.
Figure 3:
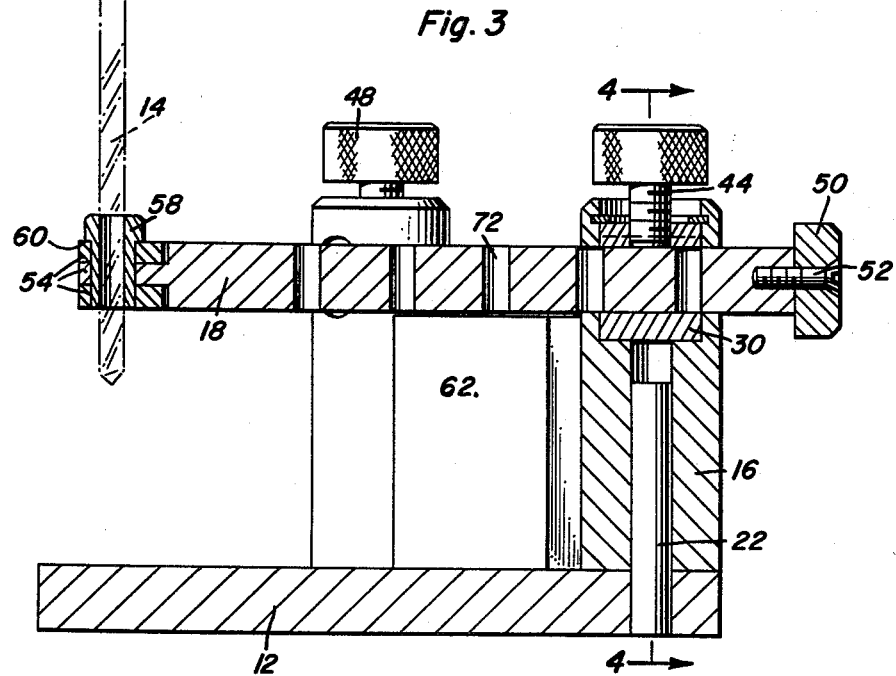

The trunnions 16, as will be best appreciated from FIGURE 2, are located at three corners of the rectangular base 12 and are mounted by means of vertically extending pins 22 for rotation about a vertical axis extending through these pins 22 which are in turn fixedly received within suitable apertures 24 within the base 12. Each trunnion 16, all the trunnions being similarly constructed, is provided with an enlarged interior chamber 26 located at its upper end with two diametrically opposed horizontally aligned apertures 28 communicating therewith so as to enable the passage of the bar 18 therethrough. Positioned within the chamber 26 directly beneath the bar 18 is a flat disk 30 supported on an annular shoulder 32 formed at the bottom of the chamber 26. This disk 30 is of a height sufficient so as to centrally orientate the bar 18 relative to the apertures 28 thus enabling its smooth adjustment therethrough. Two cylindrical segments 34, also located within the chamber 26 are provided on opposite sides of the bar 18 so as to limit its lateral movement, a second internally threaded disk 36 being provided thereover and including a depending central portion 38 receivable between the cylindrical segments 34 and positionable on top of the longitudinally adjustable bar 18. This disk 36 is maintained in position by a snap or lock ring 40 received within an annular groove 42 provided in the wall of the chamber 26 directly above the disk 36.

As will be appreciated from the drawings, the bar 18 is maintained in a predetermined longitudinally adjusted position by means of the locking screw 44 received within the threaded aperture 46 of the disk 36 and bearing, at its lower end, against the upper side of the bar 18, an enlarged knurled head 48 being provided thereon so as to simplify the loosening and tightening thereof.

Turning now specifically to the bar 18, it will be noted that this bar 18 is substantially rectangular in configuration and provided with an enlarged knurled gripping head 15 secured to its outer end in any suitable manner such as by the screw 52. The inner end of each bar 18 is provided with a reduced portion 54 having an aperture 56 therethrough and being of a height substantially equal to one-third of the height of the main portion of the bar 18 so as to allow for the superimposing of these reduced portions while maintaining the planar relationship between the bars 18, such an arrangement naturally requiring that the reduced portion 54 be positioned at the bottom of one bar 18, at the top of a second bar 18 and centrally located relative to a third bar 18. In their superimposed positions, the apertures 56 in each of the reduced portions 54 are vertically aligned for the reception of a drill bushing 58 therethrough. In order to accommodate various size drills 14, it is contemplated that a variety of different sized interchangeable bushings 58 be provided with each bushing 58 having an enlarged upper portion forming an annular shoulder 60 which rests on the uppermost reduced section 54. From the foregoing, it is considered to be readily apparent that through the longitudinal and rotational adjustment of the bars 18 the drill bushing 58 can be fixedly secured in a wide range of adjusted positions relative to a subjacent workpiece located on the upper surface of the base 12.

In order to maintain the workpiece (not illustrated) in a predetermined location, two vertical plates 62 are provided with the vertical plates 62 being releasably secured in position by suitable fastening means 64 extending through lower rearwardly projecting flanges 66 on the vertical plates 62 and into the supporting base 12, the vertical plates 62 being maintained in the proper vertical plane by means of a pair of dowels 63 secured within the base 12 in the same manner as rods 22 and being engageable with the back surface of the adjacent vertical plate 62. Such an arrangement allows the entire jig 10 to be disassembled and subsequently assembled while still maintaining the proper orientation of the various parts.

With particular attention being directed to FIGURE 2, it will be appreciated that the trunnions are arranged so that the centers of the trunnions A and B are on a line perpendicular to a line extending through the centers of the trunnions C and B. The vertical plates 62 are located, one between the trunnions A and B and the other between the trunnions C and B so that the planes of the forward faces thereof are perpendicular to each other and parallel to the aforementioned lines through the centers of the trunnions with the planes of these forward faces of the vertical members 62 also being tangential to the corresponding trunnions, either A and B or C and B.

From the foregoing, it will be readily apparent that the workpiece is positioned on the upper surface of the base 12 and in engagement with the vertical plates 62 and maintained in this position in a suitable manner while the desired hole or holes are drilled by the insertion of the drill 14 through the drill bushing 58 which has been previously set at a predetermined adusted location. In order to facilitate this adjustment, the rod 18 can be provided with both suitable indicia 70 thereon and suitable holes 72 therethrough thereby enabling the setting of the members with micrometers as well as other suitable instruments.

Additionally, it will be appreciated that because of the right angular arrangement of the trunnions A, B and C, and the parallel orientation of a workpiece relative thereto, the length of the various rods from the center of each trunnion can be quickly determined by providing three right triangles, each rod 18 forming the hypotenuse of one of the triangles with the length of this hypotenuse rod equaling the square root of the sum of the squares of the other two sides, suitable interpolations obviously being made for the trunnions, their radius being a known factor. By such a method, the length of the rod 18 projecting beyond the trunnions 16 can be quickly determined, and after adjustment of all of the rods 18 to such determined lengths, these rods 18 need only be pivoted into overlapping relationship with the holes 56 therein aligned and the drill bushing 58 then inserted therethrough thus maintaining the rods 18 in proper alignment for subsequent use of the drill 14. The three-way check provided by such a system is considered of prime significance if precision work is to be done.

From the above description taken in conjunction with the drawings, it is readily apparent that a novel drill jig has been defined containing all of the attributes of conventional drill jigs while at the same time being adjustable and including all of the advantages attributed thereto supra, such advantages being heretofore unavailable in a single device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable drilling jig comprising a flat base, a first vertical member mounted on said base and projecting thereabove for rotation about its own vertical axis, a second vertical member rotatably mounted on said base in spaced parallel relation to and in a first vertical plane with the first vertical member, a third vertical member rotatably mounted on said base in spaced parallel relation to said first member in a second vertical plane, said three members forming a right angle for the reception of a workpiece therein on the base, each of said members having an elongated bar projecting through the upper portion thereof for individual rotation therewith parallel to the base above the workpiece, each bar being longitudinally adjustable through the corresponding member, said bars converging inwardly toward each other, and means releasably interconnecting the inner ends of said bars, said means consisting of a vertical drill bushing.

2. The device of claim 1 including a pair of spaced perpendicularly oriented vertical plates fixed to the base and projecting thereabove, one plate being orientated between the first and second members with the inner face thereof generally tangential to these members, the second plate being orientated between the first and third members with the inner face thereof generally tangential to these members.

3. The device of claim 2 including means releasably fixing said plates to the base, this last mentioned means consisting of an outwardly projecting securing flange on the lower edge of each plate, a removable fastener extending through each flange and into the base, and a pair of vertical stops fixed to the base and projecting therefrom, one on each side of the flange, said stops being engaged with the outer face of the plate so as to assist in preventing movement thereof.

4. The device of claim 3 wherein each member includes a vertical rod fixed to the base, and a tubular member rotatably engaged thereover.

5. The device of claim 4 wherein the elongated bars projecting parallel to the base are coplanar, the inner end of each of these bars being reduced to approximately one-third the height of the bar and including a vertical aperture therethrough for reception of the drill bushing upon superimposed alignment of the reduced ends and the apertures therein.

6. The device of claim 5 wherein each tubular member includes an enlarged internal chamber adjacent the upper end thereof, a pair of diametrically opposed apertures communicating with the chamber so as to allow passage of the elongated bar therethrough, a rigid member above that portion of the bar within the chamber, and a locking member adjustably mounted in rigid member for selective projection therebelow into locking engagement with the elongated bar so as to prevent movement thereof.

7. The device of claim 1 wherein the elongated bars projecting parallel to the base are coplanar, the inner end of each of these bars being reduced to approximately one-third the height of the bar and including a vertical aperture therethrough for reception of the drill bushing upon superimposed alignment of the reduced ends and the apertures therein.

8. The device of claim 1 wherein each member includes an enlarged internal chamber adjacent the upper end thereof, a pair of diametrically opposed apertures communicating with the chamber so as to allow passage of the elongated bar therethrough, a rigid member above that portion of the bar within the chamber, and a locking member adjustably mounted in rigid member for selective projection therebelow into locking engagement with the elongated bar so as to prevent movement thereof.

References Cited by the Examiner

UNITED STATES PATENTS 2,435,256  2/48  Whitmore _____ 77—62
2,619,730  12/52 Carter _____ 77—62 X

FOREIGN PATENTS 792,427  3/58  Great Britain.

WILLIAM W. DYER, Jr., *Examiner.*